No. 700,590. Patented May 20, 1902.
H. C. WEEKS.
BICYCLE.
(Application filed Mar. 1, 1901.)

(No Model.) 2 Sheets—Sheet 1.

WITNESSES:
William P. Gaebel.
Theo. G. Hoster

INVENTOR
Henry C. Weeks
BY
ATTORNEYS

THE NORRIS PETERS CO., PHOTO-LITHO., WASHINGTON, D. C.

No. 700,590. Patented May 20, 1902.
H. C. WEEKS.
BICYCLE.
(Application filed Mar. 1, 1901.)
(No Model.) 2 Sheets—Sheet 2.
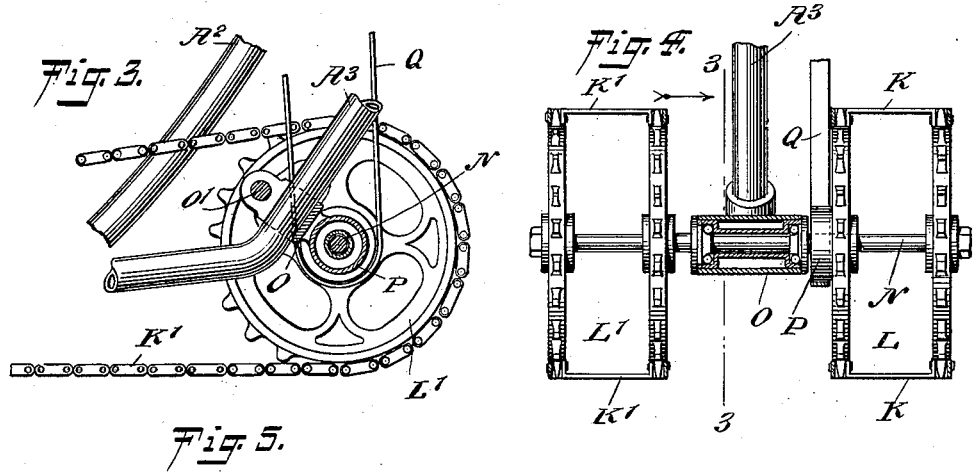
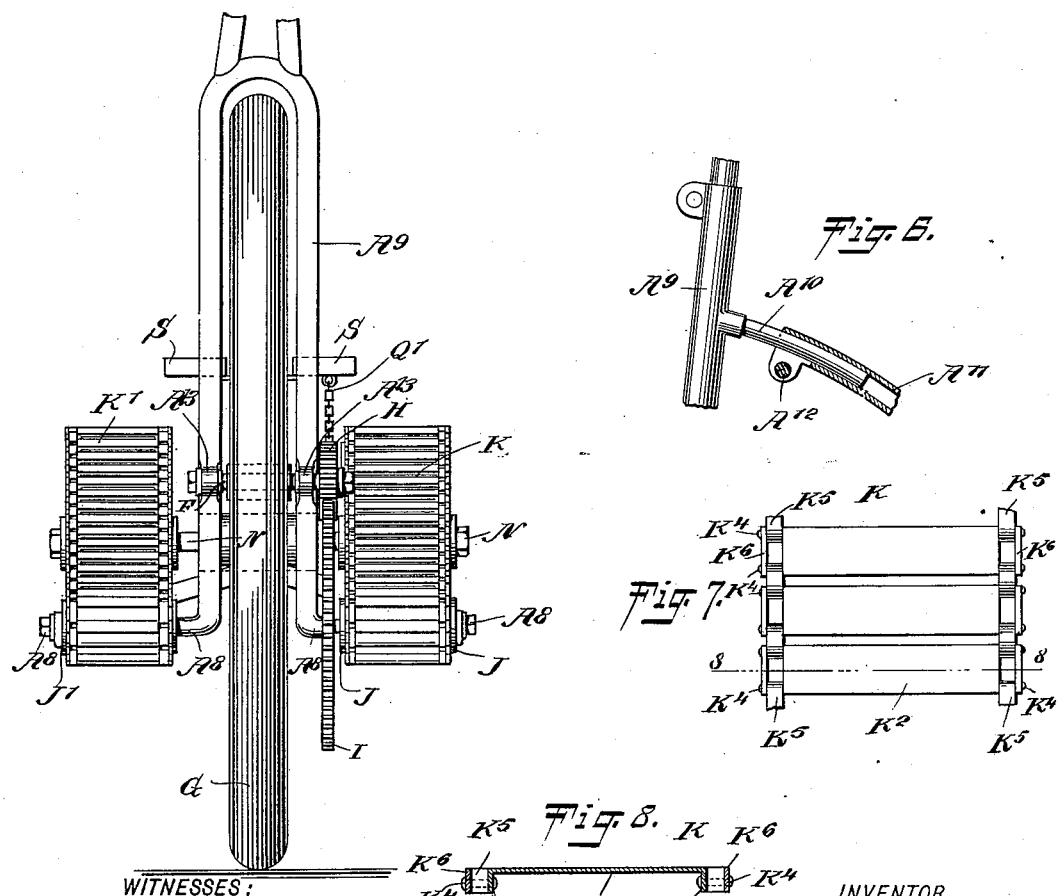
WITNESSES:
William P. Goebel.
Geo. G. Hosford
INVENTOR
Henry C. Weeks
BY
ATTORNEYS

UNITED STATES PATENT OFFICE.

HENRY C. WEEKS, OF BAYSIDE, NEW YORK.

BICYCLE.

SPECIFICATION forming part of Letters Patent No. 700,590, dated May 20, 1902.

Application filed March 1, 1901. Serial No. 49,437. (No model.)

*To all whom it may concern:*

Be it known that I, HENRY C. WEEKS, a citizen of the United States, and a resident of the city of New York, Bayside, borough of Queens, in the county of Queens and State of New York, have invented a new and Improved Bicycle, of which the following is a full, clear, and exact description.

The invention relates to bicycles such as shown and described in the Letters Patent of the United States No. 664,826, granted to me on December 25, 1900.

The object of the present invention is to provide a new and improved bicycle arranged to insure an easy propulsion, the bicycle being very simple and durable in construction and composed of comparatively few parts, not liable to get out of order.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
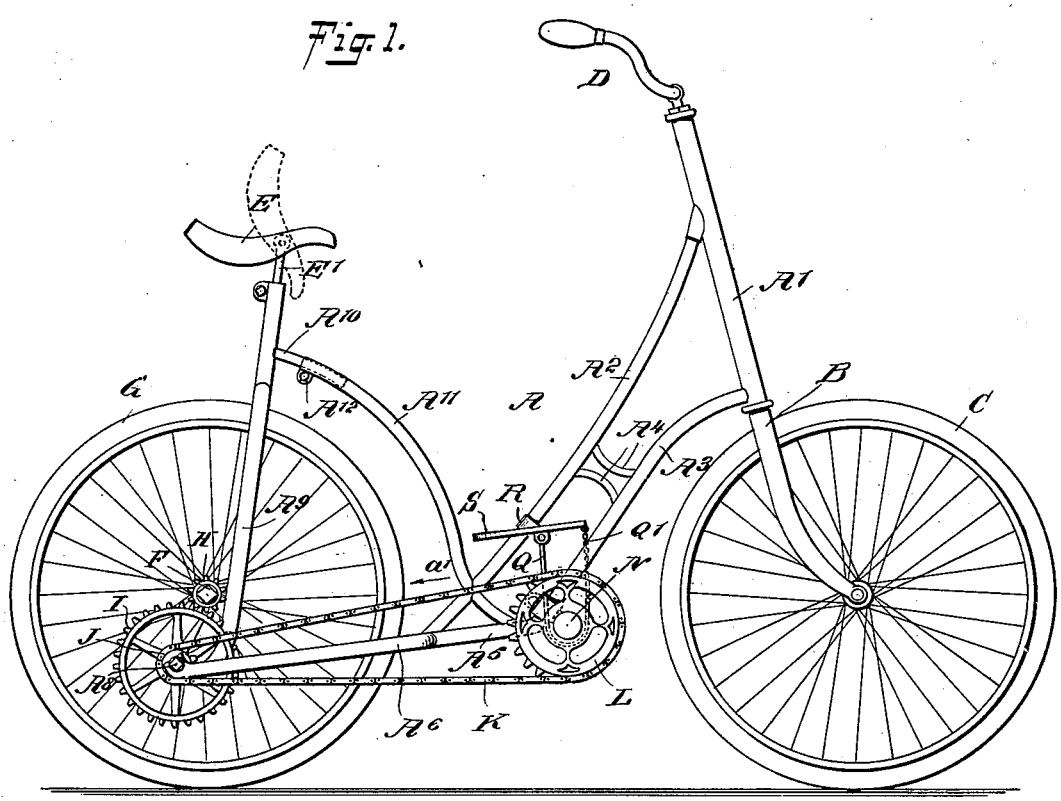
Figure 2:
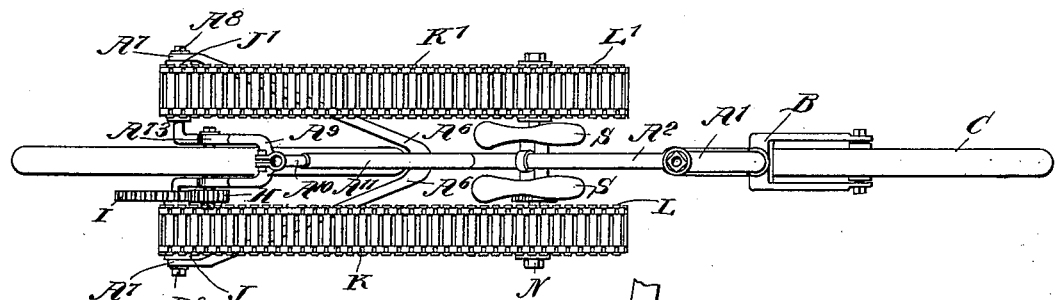
Figure 3:
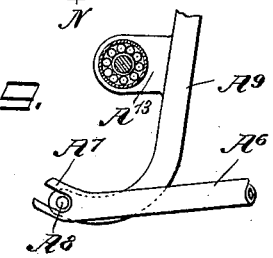

Figure 1 is a side elevation of the improvement. Fig. 2 is a plan view of the same with the handle-bar and seat removed. Fig. 3 is an enlarged sectional side elevation of the brake and adjacent parts, the section being on the line 3 3 in Fig. 4. Fig. 4 is a cross-section of the same. Fig. 5 is an enlarged rear end elevation of the improvement. Fig. 6 is an enlarged sectional side elevation of the adjustable connection between the rear fork and the center brace. Fig. 7 is an enlarged plan view of part of the tread. Fig. 8 is a cross-section of the same on the line 8 8 in Fig. 7, and Fig. 9 is an enlarged side elevation of the lower end of the rear fork and the rear end of the rear lower brace.

The frame A of the bicycle is provided with a steering-head $A'$, in which is mounted to turn the front or steering fork B, carrying the front wheel C and the handle-bar D. From the steering-head $A'$ extend downwardly and rearwardly the lower braces $A^2 A^3$, rigidly connected with each other by bars $A^4$, the lower end of the brace $A^3$ terminating in the rear lower brace $A^5$, formed with diverging arms $A^6$, as is plainly shown in Fig. 2, the brace $A^2$, previously mentioned, also terminating in the brace $A^5$ at or near the beginning of the diverging arms $A^6$. The rear ends of the arms $A^6$ are formed with notches $A^7$, into which extend the rear axles $A^8$, secured to or forming integral parts of the lower ends of the members of the rear fork $A^9$, adjustably supporting at its upper end a saddle-post $E'$, carrying a saddle E. The upper portion of the rear fork $A^9$ is connected by a center brace with the braces $A^2 A^3$, and said center brace is made in sections $A^{10} A^{11}$, of which the section $A^{10}$ is rigidly secured to the upper end of the rear fork $A^9$ and telescopes with the section $A^{11}$. A suitable clamping device $A^{12}$ is provided on the section $A^{11}$ to securely clamp the section $A^{10}$ in place after the desired adjustment is made, as hereinafter more fully described.

On the members of the rear fork $A^9$ are formed rearwardly-projecting lugs with ball-bearings $A^{13}$ for the axle F of the wheel G to turn in, and on one side of the axle F is secured a pinion H, in mesh with a gear-wheel I, mounted to turn on the corresponding axle $A^8$ and secured to a small double sprocket-wheel J, over which passes a sprocket-tread K, also passing over a double sprocket-wheel L, secured on the front shaft N, journaled in suitable bearings in a hanger O, adjustably held on the lower end of the brace $A^3$, as is plainly shown in Fig. 3, said hanger O being secured in place by a suitable clamping device $O'$. The tread K, the wheels I, J, and L extend on one side of the frame A, and similar wheels $L' J'$ are arranged on the other side of the frame, together with a tread $K'$, said wheel $L'$ being preferably a double sprocket-wheel secured on the shaft N, and the wheel $J'$ being a double sprocket-wheel mounted to turn on the corresponding axle $A^8$. The hanger O may be attached to the lower end of the brace $A^2$ to give more incline to the upper run of the treads K $K'$, and said hanger instead of extending downward, as shown, may be turned over to extend on the upper side of the brace $A^3$ or $A^2$ for a like purpose.

On the shaft N, between the hanger O and either of the double sprocket-wheels L or $L'$, is secured a brake-wheel P, engaged by a brake-band Q, secured at one end to a clip R, attached to either the brace A² or A³, and the other end of said brake-band Q is connected by a chain Q' or the like with treadles S, fulcrumed on said clip R and adapted to be operated by the rider's feet to impart a swinging motion to the treadles S, and thereby apply or release the brake-band Q to brake the bicycle. It is not absolutely necessary that the brake be located on the shaft N, as shown, as it may be placed on one of the rear axles.

The treads K K' are endless, and each is formed with sprocket-chains at the sides to mesh with the double sprocket-wheels J L and J' L', respectively. Each of the treads K K' is made in sections K², formed with downwardly-extending flanges K³, supporting outwardly-extending pins K⁴ for connecting-links K⁵ to connect adjacent sections K² with each other, the adjacent pins of a section K² being also connected with each other by links K⁶, as is plainly indicated in Figs. 7 and 8. The treads K K' are of sufficient width to allow convenient application of the rider's feet, and the upper run of said treads K K' is given any desired inclination from the front downwardly and rearwardly to allow the operator to conveniently actuate the treads and impart a rotary motion to the sprocket-wheels J J' and rotate the rear wheel G by the gear-wheel I, meshing with the pinion H, secured to the axle of the rear wheel G.

It is apparent that the fulcrum of the saddle-post or rear fork A⁹ is at A⁸ and that the adjustment of said fork forward or back shifts the rear wheel correspondingly—that is to say, the axle F of the rear wheel and the points A⁸ in such case revolve relative to each other planetwise—whereby the rear portion of the entire rigid frame is raised or lowered, as the case may be, the front axle being in such case the fulcrum on which the adjustment is made. When the rear fork is adjusted from one inclination to another, it is obvious the clamping device A¹² will be loosened and tightened, as required. Such adjustment of the rear wheel G obviously raises or lowers the rear ends of the treads K, and thereby changes the inclination of the same. The hanger O may be adjusted on the frame-bar A³ for the purpose of taking up any slack or wear in the treads K.

It is understood that the upper runs of the endless treads K K' form an inclined walking-surface for the rider's feet to walk on, and thereby impart a traveling motion to the treads in the direction of the arrow a', and this motion is transformed into a rotary motion and transmitted to the rear or driving wheel G of the bicycle by the wheels J and I and the pinion H to cause the bicycle to travel forward. It is further understood that the rider stands with both feet on the upper runs of the treads, and by exerting his walking powers an alternate motion is given to the treads in the direction of the arrow a', so that the machine receives continuous impulses for propelling the bicycle steadily and continuously forward. As the rider stands on the inclined treads, it is evident that not only the walking power is utilized for the propulsion of the bicycle, but also the rider's weight, and by the rider pushing on the handle-bars power is added to the legs to propel the bicycle at a very high rate of speed. It will be seen that in using the bicycle the rider is in an upright position, and consequently the health of the rider is not liable to be impaired.

When the rider desires to rest or to stop the bicycle, the feet are removed from the treads and placed on the treadles, so that no further propelling impulses are given to the bicycle, and then if it is desired to operate the brake the treadles are actuated by the feet to draw the brake-band Q in firm contact with the brake-wheel P to brake the shaft N or one of the rear axles, and thereby retard the traveling motion of the treads K K', the wheels J and I, the pinion H, and the rear wheel G to finally bring the bicycle to a stop. By having the sprocket-chains on the sides of the treads K K' and engaging the sprocket-wheels J L J' L' there is no slipping of the treads, and consequently positive transmission is had of the power applied for propelling as well as for braking purposes.

By constructing the endless treads as described they are rendered extremely strong and durable, especially by providing a sprocket-chain on each side of a tread.

Having thus fully described my invention, I claim as new and desire to secure by Letters Patent—

1. A bicycle comprising a front wheel, a rigid frame having a horizontal lower rear brace A⁶, the rear brace or fork A⁹, having its ends extended in alinement and constituting journals, sprocket-wheels mounted on said journals, corresponding front sprocket-wheels, a transverse front shaft N, journaled in the front portion of the frame, endless traveling treads running on the four sprocket-wheels, the rear running wheel journaled in the rear fork above the lower brace, and a gear connection between such running wheel and one of the rear sprocket-wheels, substantially as shown and described.

2. A bicycle comprising a rigid frame having a lower brace, a front wheel, a rear wheel, a rear fork fulcrumed on lower brace, the rear wheel journaled in such rear fork above the fulcrum, means for holding the rear fork in any forward-and-back adjustment, sprocket-wheels mounted on journals formed on the lower ends of the rear fork, a front shaft and sprocket-wheels therein, endless treads running on the sprocket-wheels, and gearing connecting the rear wheel and treads, substantially as shown and described.

3. A bicycle comprising a frame which is fulcrumed on the front axle, and the rear fork or saddle-post, which is adjustable forward and back and fulcrumed at the rear end of the aforesaid frame, the rear wheel journaled on the said fork at a point above its fulcrum, and having a pinion on its axis, a gear-wheel meshing with the said pinion and having its axis coincident with the fulcrum of the rear fork, a shaft N arranged transversely between the running wheels, and endless treads running on sprocket-wheels arranged on said shaft and other sprocket-wheels journaled on the rear fork, substantially as shown and described.

In testimony whereof I have signed my name to this specification in the presence of two subscribing witnesses.

HENRY C. WEEKS.

Witnesses:
  THEO. G. HOSTER,
  EVERARD BOLTON MARSHALL.